United States Patent
Bao et al.

(10) Patent No.: US 11,921,563 B1
(45) Date of Patent: Mar. 5, 2024

(54) OPERATING DEVICE OF CROSS-POWER DOMAIN MULTIPROCESSOR AND COMMUNICATION METHOD THEREOF

(71) Applicant: CHIPINTELLI TECHNOLOGY CO., LTD, Chengdu (CN)

(72) Inventors: Zhaohua Bao, Chengdu (CN); Wei Tian, Chengdu (CN); Lai Zhang, Chengdu (CN)

(73) Assignee: CHIPINTELLI TECHNOLOGY CO., LTD, Chengdu (CN)

( * ) Notice: Subject to any disclaimer, the term of this patent is extended or adjusted under 35 U.S.C. 154(b) by 0 days.

(21) Appl. No.: 18/237,623

(22) Filed: Aug. 24, 2023

(30) Foreign Application Priority Data

Dec. 13, 2022 (CN) .......................... 202211593045.5

(51) Int. Cl.
*G06F 1/00* (2006.01)
*G06F 1/3287* (2019.01)
(Continued)

(52) U.S. Cl.
CPC .......... *G06F 1/3287* (2013.01); *G06F 9/3877* (2013.01); *G06F 9/544* (2013.01)

(58) Field of Classification Search
CPC ...... G06F 1/3287; G06F 9/3877; G06F 9/544; G06F 12/0831; G06F 9/5038
See application file for complete search history.

(56) References Cited

U.S. PATENT DOCUMENTS 4,622,631 A * 11/1986 Frank .................. G06F 12/0815
5,666,485 A *  9/1997 Suresh ................ G06F 13/1605
                                              714/48

(Continued)

FOREIGN PATENT DOCUMENTS

CN 101142543 A 3/2008
CN 101667144 A 3/2010
(Continued)

OTHER PUBLICATIONS

Nowatzyk et al., "The S3.mp Scalable Shared Memory Multiprocessor", Sum Microsystems Computer Corporation, Proceedings of the 27th Annual Hawaii International Conference on System Sciences, 1994, pp. 144-153.

(Continued)

*Primary Examiner* — Xuxing Chen
(74) *Attorney, Agent, or Firm* — Oliff PLC

(57) ABSTRACT

An operating device of a cross-power domain multiprocessor and a communication method thereof. The device includes: at least two processors, wherein each is connected with a processor channel connected with a memory, and the processor channel includes read and write channels; the memory and an interface parsing unit for controlling the processor channels; the memory includes a shared memory unit and a dedicated memory of each processor; a memory allocation unit for allocating the shared memory and a detection wake-up unit for detecting a processor state and receiving a data transmission command. When the processor with a receiving end in a dormant mode is awoken, information can be saved in the shared memory and processed according to the information priority after the processor is completely awake. The shared memory performs dynamic allocation according to the quantity of the wake-up processors, which improves the communication efficiency between the memory and processors.

4 Claims, 2 Drawing Sheets

(51) Int. Cl.
　　*G06F 9/38*　　　(2018.01)
　　*G06F 9/54*　　　(2006.01)

(56) References Cited

U.S. PATENT DOCUMENTS

| | | | | |
|---|---|---|---|---|
| 7,596,666 | B2* | 9/2009 | Ahn | G11C 7/1075 |
| | | | | 711/149 |
| 2008/0256305 | A1* | 10/2008 | Kwon | G06F 15/167 |
| | | | | 711/147 |
| 2011/0145514 | A1* | 6/2011 | Lee | B60Q 5/006 |
| | | | | 711/147 |
| 2016/0011987 | A1* | 1/2016 | Bouley | G06F 13/4221 |
| | | | | 710/308 |
| 2022/0164162 | A1* | 5/2022 | Ramasubramanian | H04R 3/12 |

FOREIGN PATENT DOCUMENTS

| | | |
|---|---|---|
| CN | 101882127 A | 11/2010 |
| CN | 102446159 A | 5/2012 |
| CN | 103324599 A | 9/2013 |
| CN | 106371937 A | 2/2017 |
| CN | 109933438 A | 6/2019 |
| CN | 110888831 A | 3/2020 |
| CN | 112100093 A | 12/2020 |
| CN | 113093899 A | 7/2021 |
| EP | 0 251 686 A2 | 1/1988 |
| JP | H03-55657 A | 3/1991 |

OTHER PUBLICATIONS

Xu, "A shared Memory Mechanism Based on Bus Multi-processor", Mini-Micro Systems, Department of Computer Sciences and Technology Tsinghua University, Beijing, China, vol. 24, No. 3 (Mar. 2003) pp. 321-326, www.cnki.net.

Translation of Dec. 13, 2022 Search Report issued in Chinese Application No. 2022115930455.

Translation Feb. 21, 2023 Office Action issued in Chinese Application No. 202211593045.5.

Translation of Mar. 13, 2023 Notification to Grant Patent Rights in Chinese Application No. 202211593045.5.

* cited by examiner

OPERATING DEVICE OF CROSS-POWER DOMAIN MULTIPROCESSOR AND COMMUNICATION METHOD THEREOF

FIELD OF THE INVENTION

The invention belongs to the technical field of integrated circuits, and particularly relates to an operating device of a cross-power domain multiprocessor and a communication method thereof.

BACKGROUND OF THE INVENTION

At present, as digital technologies are applied to various fields such as image processing, speech recognition, industrial automation, auto-driving, and smart home, performance requirements of various services are constantly increasing and a single-core processor cannot meet the demands due to too many processes to be handled. Therefore, at present, a multi-core processor is often used to handle relatively complex tasks. The accompanying problem is that if the multi-core processor cannot effectively synchronize information between a plurality of processors, it cannot fully exert its advantages and achieve desired effect.

In addition, with the continuous development of chip technology, power consumption is also increasing and has become a focus of attention to people. Designing a plurality of power domains is one of the effective ways to solve the problem of power consumption increase. A multiprocessor processing method is disclosed in CN106371937A and has the following shortcomings:

1. In the patent of CN106371937A, a queue is used to transmit information. At the time of information access, one processor is used to process information according to their sequence. Different information has priority for the demand end. Failure to preferentially process information with high priority is not conducive to improving the efficiency between the processors.
2. A shared memory is used between a plurality of processors. When a plurality of power domains is designed, power domains are turned off for some processors due to power consumption requirements. The turned-off processors still occupying memory in communication is not conducive to improving the efficiency of memory use.
3. In the existing scheme, when a processor sends information to other processors, the other processors are definitely in working mode. However, in a multi-power domain circuit, it is very likely that a communication processor is in a dormant mode. The conventional measure is to wake up a target processor at a receiving end through interruption, and then send information to the target processor at the receiving end. It takes a certain time to wake up, and a source processor at a sending end sends information until the target processor at the receiving end is in a working mode, and should be effectively utilized in the wake-up period.
4. A plurality of processors communicate with each other. In the prior art, a single processor can access information only through one data channel, so it is necessary to wait when one processor simultaneously communicates with a plurality of processors, and communication requirements cannot be met when three or more processors communicate with each other at the same time.

BRIEF SUMMARY OF THE INVENTION

In order to overcome the defects in the prior art, the invention discloses an operating device of a cross-power domain multiprocessor and a communication method thereof.

The operating device of the cross-power domain multiprocessor according to the invention includes at least two processors, where each processor is connected with a processor channel connected with a memory, and the processor channel includes a read channel and a write channel; the operating device further includes the memory and an interface parsing unit for controlling the processor channels; the memory includes a shared memory unit and a dedicated memory of each processor; the operating device further includes a memory allocation unit for allocating the shared memory and a detection wake-up unit for detecting a processor state and receiving a data transmission command.

Preferably, the memory allocation unit is in signal connection with the detection wake-up unit.

Preferably, the read channel and the write channel each include two channels.

The invention further discloses a communication method of a cross-power domain multiprocessor, including the following steps:

S1. Receiving a command, confirming a source processor and a target processor required for communication, and detecting whether the source processor and the target processor are in a working mode;

S2. Waking up a processor in a dormant mode;

S3. Preparing data information to be interacted by the source processor;

S4. Allocating, by a memory allocation unit, a shared memory into a shared memory unit for the source processor and the target processor which are waken up; and storing, by the source processor, the data information to be interacted into the dedicated memory or shared memory of the target processor;

S5. With a read channel being idle, increasing the read idle occupied bit of the read channel in the processor channel of the target processor; occupying the read channel to read data prepared by the source processor from a memory by the target processor; with the read channel not being idle, waiting the read channel until to be idle;

S6. Reading, by the target processor when monitoring the increase of the occupied bit of the read channel for receiving data, data information stored into the dedicated memory or shared memory by the source processor from the read channel;

S7. After data reading, lowering the read idle occupied bit of the read channel;

With a write channel being idle, increasing the write idle occupied bit of the write channel in the processor channel of the target processor; writing returned information after processing into the shared memory allocated by the source processor by the write channel; with the write channel not being idle, waiting the write channel until to be idle;

S8. Reading, by the source processor when monitoring the increase of the write idle occupied bit of the write channel in the processor channel of the target processor, returned information from the shared memory thereof, and lowering the write idle occupied bit;

S9. Waiting for a next assignment.

Preferably, in Step S2, if both the source processor and the target processor are in a dormant mode, the detection wake-up unit wakes them up; if one of the source processor and the target processor is in a working mode, the processor in a working mode wakes up the processor in a dormant mode.

Preferably, in Step S4, the source processor preferentially stores the data information to be interacted in the shared memory, and if the shared memory is fully occupied, the data information is stored in the dedicated memory of the target processor.

Preferably, in Steps S5 and S7, during idle channel waiting, a communication request is handed over to an interface parsing unit for queuing; and the interface parsing unit determines the priority of the communication request and preferentially allocates a request with high priority when the channel is idle.

In the operating device of the cross-power domain multiprocessor of the invention, each processor includes a plurality of channel channels, and identifies the priority of the information not processed. When the processor with a receiving end in a dormant mode is waken up, information can be saved in the shared memory and then processed according to the information priority after the processor is completely waken up. The shared memory performs dynamic allocation according to the quantity of the wake-up processors, which improves the communication efficiency between the memory and the processors.

DETAILED DESCRIPTION OF PREFERRED EMBODIMENTS OF THE INVENTION

The specific embodiments of the invention will be further described in detail below.

Figure 1:
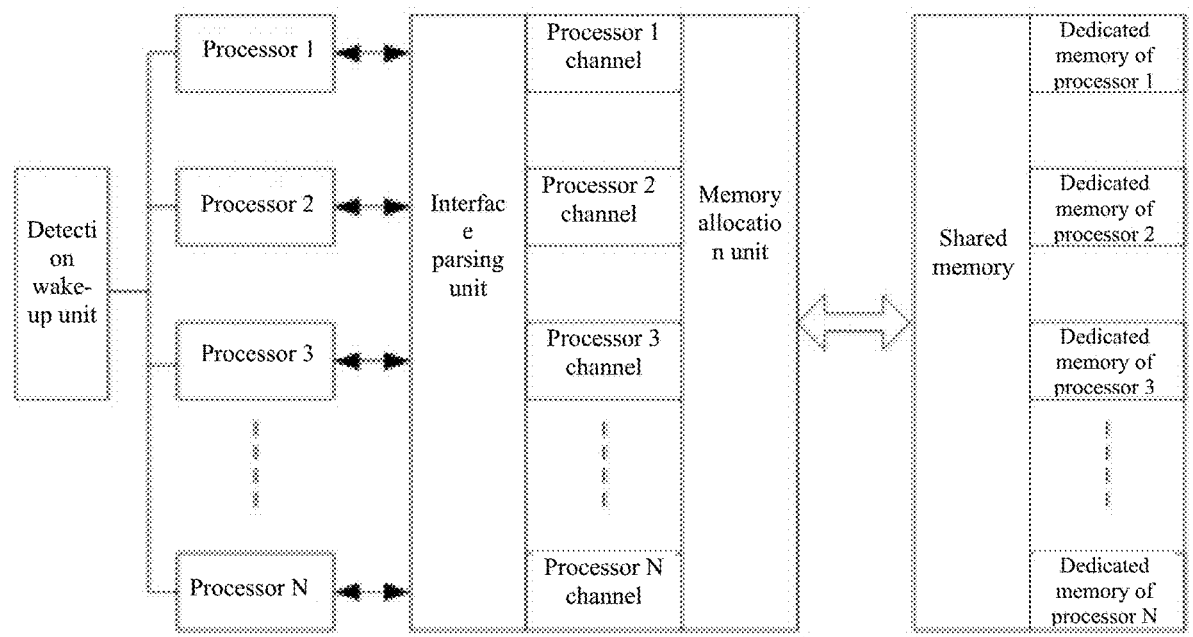
FIG. 1 shows a schematic diagram of an operating device of a cross-power domain multiprocessor according to a specific embodiment of the invention.

As shown in FIG. 1, the operating device of the cross-power domain multiprocessor according to a specific embodiment of the invention is composed of a plurality of processors required for communication, an interface parsing unit for parsing each processor interface, a plurality of processor channels, a memory allocation unit, a shared memory, and a dedicated memory for each processor.

The interface parsing unit is used for parsing the interfaces of the processors, and each processor is connected to the shared memory through the parsing interface for data interaction.

The interface parsing unit has the main functions below:

The interface parsing unit is connected with all processors to detect whether the power domain where each processor is located is in the working mode. If the power domain is working normally, the processor is in the wake-up state, otherwise, it is considered that the processor is in the dormant mode, and a memory allocation unit is notified of allocating the shared memory according to the wake-up state of the processor.

The occupancy release of each processor channel is processed by the interface parsing unit, and a target processor is notified of reading and writing data information;

When the target processor is in the dormant mode, data information to be processed is given a priority. The target processor waken up processes data in an order from high priority to low priority.

A processor channel for reading and writing data information is allocated for each processor.

The processor channel provides a channel for each processor to read data, and each processor channel has four sub-channels: a first channel, a second channel, a third channel, and a fourth channel. When the first channel and the second channel are used as sending channels, the processor is regarded as a source processor, the first channel or the second channel initiates a communication request to the target processor, and waits its response to such request. When the third channel and the fourth channel are used as receiving channels, the processor is regarded as the target processor, the third channel or the fourth channel receives a communication request initiated by the source processor and monitors other communication requests sent to the processor.

The memory allocation unit is used for dynamically allocating the shared memory to the processor in a working mode. If only two processors are in a working mode, the shared memory is divided into two parts for use by them, so as to fully improve the utilization efficiency of the memory.

The memory allocation unit does not allocate the shared memory to the dormant processor, and sends a control signal to make the dormant processor store data in the dedicated memory of the processor before waken up.

When the processor is in a working mode, both the shared memory and the dedicated memory can be used, and the shared memory is preferred for storage.

A specific data interaction process between the source processor and any one of the target processors can be divided into the following three situations:
1. Both the source processor and the target processor are in a dormant mode;
2. The source processor is in a working mode, and the target processor is in a dormant mode;
3. Both the source processor and the target processor are in a working mode;

In various embodiments, each processor has four communication channels, where the first and second channels are receiving channels for receiving information; and the third channel and the fourth channel are sending channels for sending information. The channels are centrally managed by the interface parsing unit.

Embodiment 1

Figure 2:
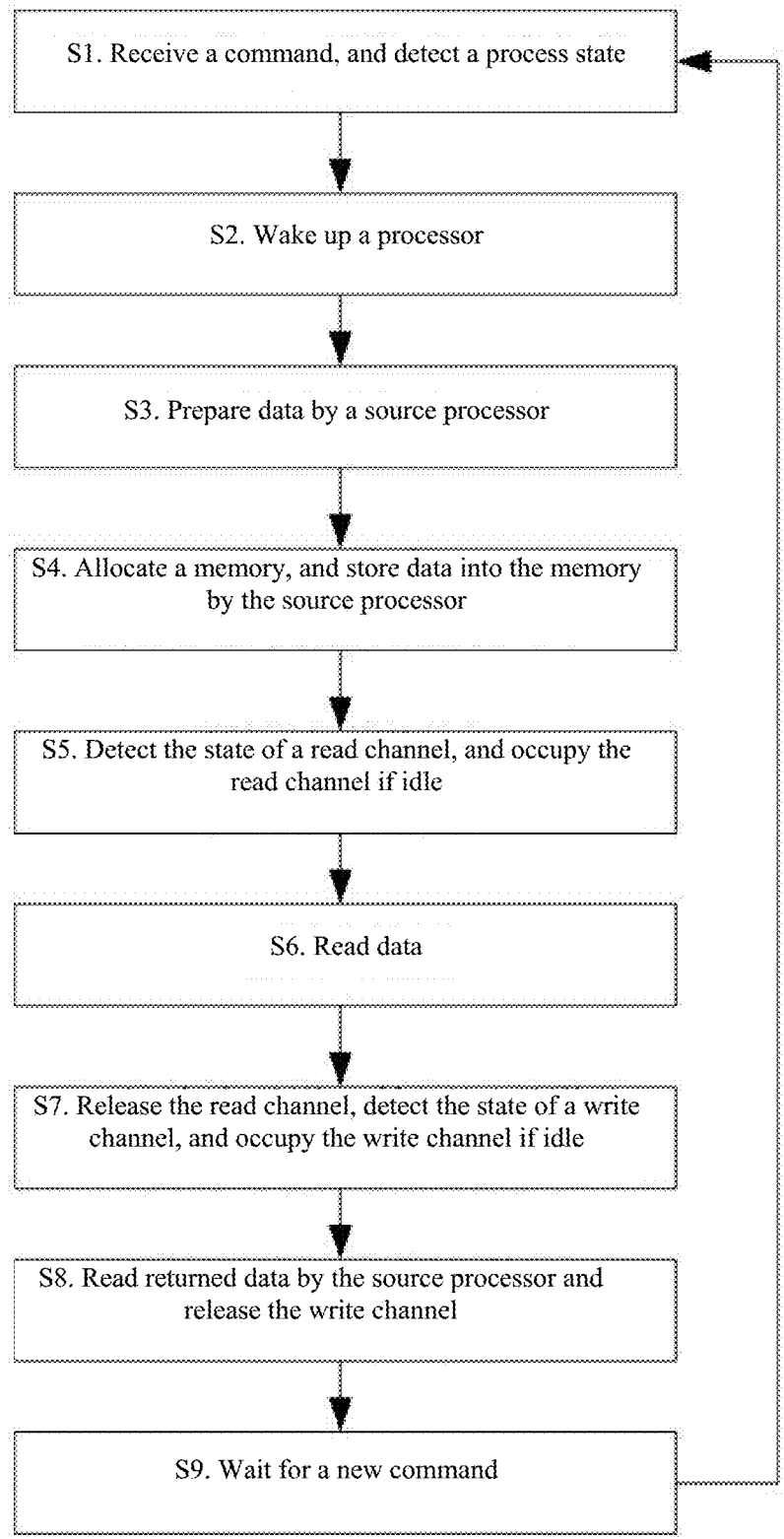
FIG. 2 shows a schematic diagram of a communication method of an operating device of a cross-power domain multiprocessor according to a specific embodiment of the invention.

When the target processor is a communication receiver and both the source processor and the target processor are in a dormant mode:

As shown in FIG. 2, a communication method specifically includes the following steps:
Step S1. Wake up the source processor and the target processor;
Wake-up operation can be performed by a wake-up source of a system, which is generally manifested by mechanisms such as external interruption and external events. Alternatively, such wake-up operation is performed by an internal timer, a voltage management unit, and the like.
Step S2. The source processor prepares data information to be interacted;
Step S3. The source processor detects the state of the target processor and waits for the wake-up of the target processor; upon the wake-up of the target processor, the third channel of the source processor or the fourth channel thereof can be used; if the target processor is not waken up, the source processor waits for its wake-up;

Step S4. The memory allocation unit allocates the memories of respective processors in the shared memory unit for the target processor and the source processor both which are waken up;

The source processor stores data information to be interacted into the dedicated memory of the target processor or the shared memory allocated for the target processor through the third channel or the fourth channel;

Step S5. Increase the read idle occupied bit of the third channel of the source processor or the fourth channel thereof. The increase of the read idle occupied bit means the occupancy of the channel, and other processors or processes cannot perform communication using the channel; the third channel of the source processor or the fourth channel thereof is occupied to read data returned from the target processor from the memory by the source processor, and to increase the read idle occupied bit of the first channel of the target processor or the second channel thereof, Step S6. When monitoring the increase of the read idle occupied bit of the first channel or the second channel for receiving data, the target processor reads communication contents stored into the shared memory or the dedicated memory by the source processor from the first channel or the second channel whose occupied bit is increased.

Step S7. After data reading, lower the read idle occupied bit of the occupied channel of the target processor. This means completion of data reading. Increase the write idle occupied bit of the occupied channel of the target processor, write information processed by the target processor into the shared memory allocated to the source processor through the first channel or the second channel occupied of the target processor, and increase the write occupied bit of the communication channel of the source processor. This means that information returned by the target processor has been prepared;

Step S8. The source processor monitors the increase of the write idle occupied bit of the third channel or the fourth channel as the communication channel, indicating that the target processor processes and returns received and sent information and communication completion. The source processor reads returned information to complete communication assignments, lowers the write idle occupied bit of the communication channel (namely the third channel or the fourth channel) of the source processor, and releases the occupied communication channel;

S9. Wait for a next assignment.

Embodiment 2

When the target processor is a communication receiver, the source processor is in a working mode, and the target processor is in a dormant mode:

Step S1. The source processor prepares data information to be interacted and stores such data information in the dedicated memory of the target processor;

Step S2. The source processor wakes up the target processor;

Step S3. The memory allocation unit allocates the memories of respective processors in the shared memory for the target processor and the source processor both which are waken up;

Step S4. The source processor detects whether the first channel of the target processor or the second channel thereof is fully occupied; if there is no idle channel, the source processor waits for the idle channel of the target processor before communication;

Step S5. With the first channel of the target processor or the second channel thereof being idle, increase the read idle occupied bit of the third channel of the source processor or the fourth channel thereof, occupy the third channel of the source processor or the fourth channel thereof to read data prepared by the target processor from the memory by the source processor, and increase the read idle occupied bit of the first channel of the target processor or the second channel thereof for receiving data;

Step S6. When monitoring the increase of the read idle occupied bit of the first channel or the second channel for receiving data, the target processor reads the contents of the source processor stored into its dedicated memory from the occupied channel;

Step S7. After data reading by the target processor, lower the read idle occupied bit of its occupied channel. This means completion of data reading. Increase the write idle occupied bit of the occupied communication channel of the source processor, and write information processed by the target processor into the shared memory of the source processor;

Step S8. The source processor monitors the increase of the write idle occupied bit of the communication channel, indicating that the target processor processes and returns received and sent information and communication completion. The source processor reads returned information to complete communication assignments, lowers the occupied bits of the write and read channels of the communication channel, and releases the channel;

Step S9. Wait for a next assignment.

Embodiment 3

When the target processor is a communication receiver, the source processor is in a working mode, and the target processor is in a dormant mode, Step s2_1. The source processor prepares data information to be interacted and stores such data information in the dedicated memory or shared memory of the target processor;

Step s2_2. The source processor detects whether the first channel of the target processor or the second channel thereof is fully occupied. If there is no idle channel, the source processor waits for it for communication, and hands over a communication request to an interface parsing unit for queuing; and the interface parsing unit determines the priority of the communication request and preferentially allocates a request with high priority when the channel is idle;

Step s2_3. With a channel (for example, first channel allocated to the target processor) being allocated to the target processor, increase the first channel of the target processor and the read occupied bit of the third channel of the source processor, and occupy the third channel to read data returned by the target processor from the memory by the source processor;

Step s2_4. When monitoring the increase of the occupied bit of the channel for receiving other processor data, the target processor reads the contents of the source processor stored into its shared memory or dedicated memory from the occupied channel.

Step s2_5. After data reading by the target processor, lower the read idle occupied bit of its occupied channel. This means completion of data reading. Increase the write idle occupied bit of the third channel of the source processor, and write information processed into the shared memory of the source processor;

Step s2_6. The source processor monitors the increase of the write idle occupied bit of the communication channel, indicating that the target processor processes and returns received and sent information and communication completion. The source processor reads returned information to complete communication assignments, lowers the occupied bits of the write and read channels of the third channel, and releases the channel;

Step 2_7. Wait for a next assignment.

In the operating device of the cross-power domain multiprocessor of the invention, each processor includes a plurality of channel channels, and identifies the priority of the information not processed. When the processor with a receiving end in a dormant mode is waken up, information can be saved in the shared memory and then processed according to the information priority until the processor is in a working mode. The shared memory performs dynamic allocation according to the quantity of the processors in a working mode, which improves the communication efficiency between the memory and the processors.

The preferred embodiments of the invention are as previously mentioned. If the preferred implementations in the preferred embodiments are not obviously self-contradictory or based on a specific preferred implementation, they can be combined and used at will. The embodiments and the specific parameters therein are only for clearly stating the verification process of the inventor's invention, instead of limiting the patent protection scope of the invention. The patent protection scope of the invention is still subject to claims, and all equivalent structural changes made based on the specification and drawings of the invention should fall within the protection scope.

The invention claimed is:

1. A communication method of a cross-power domain multiprocessor, comprising the following steps:
    S1. receiving a command, confirming a source processor and a target processor required for communication, and detecting whether the source processor and the target processor are in a working mode;
    S2. waking up a processor in a dormant mode;
    S3. preparing data information to be interacted by the source processor;
    S4. allocating, by a memory allocation unit, a shared memory into a shared memory unit for the source processor and the target processor which are waken up; and storing, by the source processor, the data information to be interacted into a dedicated memory or shared memory of the target processor;
    S5. with a read channel being idle, increasing a read idle occupied bit of the read channel in a processor channel of the target processor; occupying the read channel to read data prepared by the source processor from a memory by the target processor; with the read channel not being idle, waiting the read channel until to be idle;
    S6. reading, by the target processor when monitoring the increase of the read idle occupied bit of the read channel for receiving data, data information stored into the dedicated memory or shared memory by the source processor from the read channel;
    S7. after data reading, lowering the read idle occupied bit of the read channel;
    with a write channel being idle, increasing a write idle occupied bit of the write channel in the processor channel of the target processor; writing returned information after processing into the shared memory allocated by the source processor by the write channel; with the write channel not being idle, waiting the write channel until to be idle;
    S8. reading, by the source processor when monitoring the increase of the write idle occupied bit of the write channel in the processor channel of the target processor, returned information from the shared memory thereof, and lowering the write idle occupied bit; and
    S9. waiting for a next assignment.

2. The communication method of the cross-power domain multiprocessor according to claim 1, wherein in Step S2, if both the source processor and the target processor are in a dormant mode, a detection wake-up unit wakes them up; if one of the source processor and the target processor is in a working mode, a processor in a working mode wakes up a processor in a dormant mode.

3. The communication method of the cross-power domain multiprocessor according to claim 1, wherein in Step S4, the source processor stores the data information to be interacted in the shared memory, and if the shared memory is fully occupied, the data information is stored in the dedicated memory of the target processor.

4. The communication method of the cross-power domain multiprocessor according to claim 1, wherein in Steps S5 and S7, during idle channel waiting, a communication request is handed over to an interface parsing unit for queuing; and the interface parsing unit determines a priority of the communication request and allocates a request with high priority when the read channel is idle.

* * * * *